United States Patent [19]

Nagashima

[11] Patent Number: 5,715,220
[45] Date of Patent: Feb. 3, 1998

[54] DISC RECORDING AND/OR REPRODUCING APPARATUS WHEREIN RECORDING STARTING AND ENDING DATES AND TIMES ARE GENERATED AND RECORDED DURING A PROGRAM RECORDING MODE, AND STARTING AND ENDING DATES AND TIMES ARE DISPLAYED DURING A REPRODUCING MODE

[75] Inventor: Hideki Nagashima, Tokyo, Japan

[73] Assignee: Sony Corporation, Japan

[21] Appl. No.: 310,372

[22] Filed: Sep. 22, 1994

Related U.S. Application Data

[63] Continuation of Ser. No. 990, Jan. 6, 1993, abandoned.

[30] Foreign Application Priority Data

Jan. 9, 1992 [JP] Japan ................................ 4-019355

[51] Int. Cl.⁶ ............................................ G11B 7/00
[52] U.S. Cl. ................................... 369/54; 369/47
[58] Field of Search ........................... 369/54, 47, 48, 369/32, 33; 360/72.1, 14.2; 348/143, 152, 232; 358/909; 386/57, 60

[56] References Cited

U.S. PATENT DOCUMENTS

| | | | |
|---|---|---|---|
| 4,740,943 | 4/1988 | Davidson et al. | 369/59 |
| 4,831,438 | 5/1989 | Bellman, Jr. et al. | 348/151 X |
| 5,051,971 | 9/1991 | Yamagishi et al. | 369/32 |
| 5,124,963 | 6/1992 | Ando | 369/58 X |
| 5,253,121 | 10/1993 | Asano | 360/72.1 X |

FOREIGN PATENT DOCUMENTS

| | | |
|---|---|---|
| 0 546 189 A1 | 6/1993 | European Pat. Off. |
| 32 41 623 A1 | 5/1984 | Germany |

OTHER PUBLICATIONS

Electronics & Wireless World, vol. 93, No. 1608, Oct. 1986 Surrey GB, pp. 45–46, Frances Stubbs, Ph.D. 'IBM's PC filing system'.

Patent Abstracts of Japan vol. 015 No. 327 (P–1240), 20 Aug. 1991 & JP–A–03 119587 (Nippon Telegr & Teleph Corp).

Patent Abstracts of Japan vol. 008 No. 183 (P–296), 23 Aug. 1984 & JP–A–59 072691.

*Primary Examiner*—W. R. Young
*Attorney, Agent, or Firm*—Limbach & Limbach L.L.P.

[57] ABSTRACT

A disc recording and reproducing apparatus for using an optical disc having a recording area in which information signals are recorded and a lead-in area in which data related to the information signals recorded in the recording area is recorded includes a timer, a display, recording and reproducing apparatus and a controller. The timer counts at least the current time and outputs time data. The display displays time corresponding to the time data. The recording and reproducing apparatus records and reproduces the information signals and the time data on the optical disc. The controller controls the recording and reproducing apparatus and the display. The recording and reproducing apparatus is controlled by the controller during the recording for recording the information signals in the recording area of the optical disc and for recording the time data from the timer in the lead-in area of the optical disc. The recording and reproducing apparatus is also controlled by the controller during the playback for reading and reproducing the information signals recorded in the recording area. The display is controlled by said controller to display the time corresponding to the reproduced time data.

3 Claims, 7 Drawing Sheets

_5,715,220_

DISC RECORDING AND/OR REPRODUCING APPARATUS WHEREIN RECORDING STARTING AND ENDING DATES AND TIMES ARE GENERATED AND RECORDED DURING A PROGRAM RECORDING MODE, AND STARTING AND ENDING DATES AND TIMES ARE DISPLAYED DURING A REPRODUCING MODE

This is a continuation of application Ser. No. 08/000,990 filed on Jan 6, 1993, now abandoned.

BACKGROUND

1. Field of the Invention

The present invention relates to a disc recording and reproducing apparatus for using an optical disc. More particularly, the present invention relates to recording not only information signals but also the recording start time etc. on an optical disc.

2. Background of the Invention

The present-day society is called the intelligence society replete with a voice information, a video information etc.

As recording and/or reproducing apparatus for the abundant information, there are known, for example, a tape recorder or a disc recording and/or reproducing apparatus. The tape recorder makes use of a magnetic tape as a recording medium, and voice data corresponding to the voice information is recorded or reproduced on or from the magnetic tape.

On the other hand, the disc recording and/or reproducing apparatus includes an optical head and an external magnetic field generating apparatus and uses a magneto-optical disc. The magneto-optical disc has an external magnetic layer as a recording medium. The magneto-optical disc has its overall recording area divided into a data recording area for recording voice data and a lead-in area for recording so-called table-of-contents (TOC) data, such as the recording a start address, recording an end address, absolute time data and others.

During the recording of voice data, an external magnetic field corresponding to the voice data to be recorded is applied from e.g. an upper side surface of the magneto-optical disc by the external magnetic field generating apparatus, and a laser beam is radiated on a lower side surface of the magneto-optical disc by an optical head. The portion of the magneto-optical disc irradiated with the laser beam from the optical head is heated to the Curie temperature and magnetized in accordance with the applied external magnetic field. As a result, the voice data is recorded on the magneto-optical disc.

For reproducing voice data recorded in the data recording area, a laser beam is radiated on the portion of the magneto-optical disc from the optical head and the laser beam reflected from the magneto-optical disc is received. At this time, the intensity of the laser beam is lower than the intensity of the laser beam during recording the voice data on the magneto-optical disc. As a result, the voice data is read from the magneto-optical disc.

In this case, the TOC data is read in advance from the lead-in area. As a result, the recording and/or reproducing apparatus recognizes the positions of each of the data. When a playback request of a designated voice data is received, the recording and/or reproducing apparatus translates the optical head to the target position of the magneto-optical disc corresponding to the designated voice data and start to the playback.

As a result, the disc recording and/or reproducing apparatus may access desired voice data more speedily than the tape recorder. Since the disc recording and/or reproducing apparatus is a contactless recording and/or reproducing system, the voice data may be conserved semi-permanently with excellent durability.

Although the voice data recording time of the magneto-optical disc is on the order of 70 minutes on one side of the magneto-optical disc, an optical disc capable of recording voice data continuing for 70 minutes or longer or an optical disc capable of recording voice data on both sides have been developed.

In addition to the so-called write-once disc, an optical disc on which data may be recorded by the user a desired number of times is also becoming popular. Also, a disc recording and/or reproducing apparatus for recording and/or reproducing voice data on or from the optical disc is also becoming popular. It is predicted that the optical disc will be used in increasing numbers in place of the magnetic tape as a recording medium for recording and storing the voice information.

However, if the above-mentioned disc recording and/or reproducing apparatus are used in increasing numbers, a large amount of voice data is recorded in one optical disc. In controlling the voice data recorded in the optical disc, the time or date etc. of recording the voice data becomes crucial.

Although it may be contemplated to write the date and/or time as the TOC data in the lead-in area by manual operation of the user in accordance with a memo on which is recorded the date and/or time when the voice data is recorded. This method is incorrect as means conserving the date or time of recording the voice data. Besides, it is troublesome to perform such manual operation subsequently.

SUMMARY OF THE INVENTION

It is, therefore, an object of the invention to provide a disc recording and/or reproducing apparatus which resolves the above mentioned problems.

It is another object of the invention to provide a disc recording and reproducing apparatus whereby at least the time of recording voice data recorded on an optical disc may be automatically written as TOC data when recording the voice data on the optical disc.

According to a first embodiment of the present invention, there is provided a disc recording and reproducing apparatus for using an optical disc which has a recording area for recording information signals and a lead-in area for recording data related to the information signals recorded in the recording area including a timer, a display, a recording and reproducing apparatus and a controller. The timer counts at least current time and outputs time data. The display displays time corresponding to the time data. The recording and reproducing apparatus records and reproduces the information signals and the time data on the optical disc. The controller controls the display and the recording and reproducing apparatus. The recording and reproducing apparatus is controlled by the controller during the recording for recording the information signals in the recording area of the optical disc and for recording the time data from the timer in the lead-in area of the optical disc. The recording and reproducing apparatus also is controlled by the controller during the playback for reading and reproducing the information signals recorded in the recording area. The display is controlled by the controller to display the time corresponding to the reproduced time data.

According to a second embodiment of the present invention, there is provided a disc-shaped recording medium including a recording area recording information signals and a lead-in area having a first area and a second area. In the first area of the lead-in area is recorded data which is used to record the information signals in the recording area in advance. In the second area of the lead-in area is recorded the time data. The lead-in area is provided as an inside portion of the optical recording medium to the recording area.

According to a third embodiment of the present invention, there is provided a disc recording apparatus for using an optical disc which has a recording area for recording information signals and a lead-in area having a first area for recording data which is used to record the information signals in the recording area in advance and a second area for recording the time data including a timer, a recording apparatus and a controller. The timer counts at least current time and outputs time data. The recording apparatus records the information signals and the time data on the optical disc. The controller controls the recording apparatus to record the information signals in the recording area of the optical disc and the time data from the timer in the second area of the lead-in area.

In the disc recording and/or reproducing apparatus according to the present invention, by controlling the recording and/or reproducing apparatus by a controller during recording so that recording data is recorded during recording in the recording area and at least the time data supplied from a timer is recorded in the lead-in area of the optical disc, and by controlling the recording and/or reproducing apparatus by the controller during playback so that the recording data recorded in the recording area of the optical disc and at least the time data recorded in the lead-in area are read out and reproduced, and by controlling a display for displaying the time at least corresponding to the reproduced time data, at least the correct time of recording the recording data may be easily recognized to reduce the load of controlling the recording data.

BRIEF DESCRIPTION OF THE DRAWING

The invention will be more readily understood with reference to the accompanying drawing, wherein.

DESCRIPTION OF THE INVENTION

Figure 1:
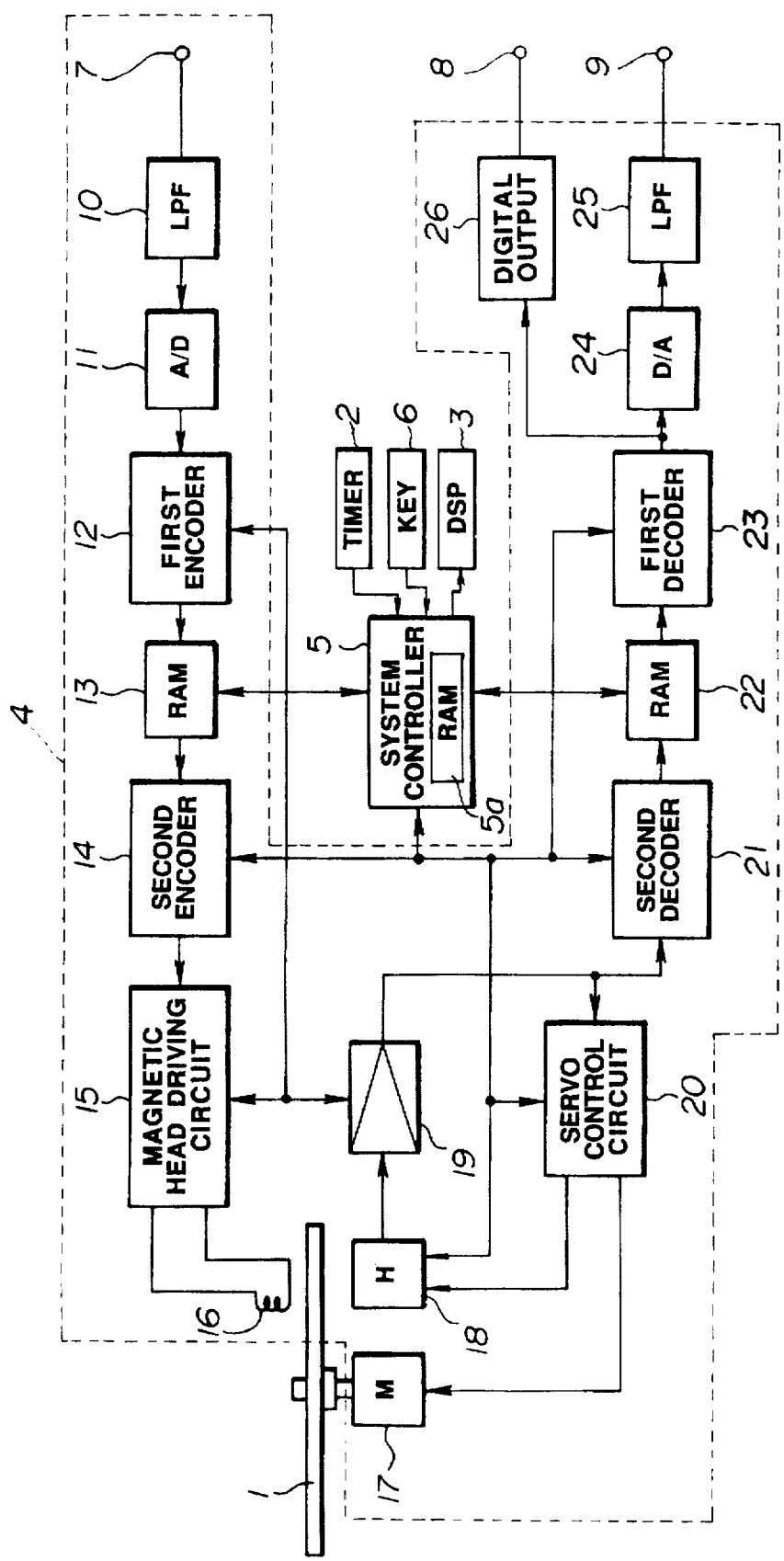
FIG. 1 shows a block diagram of a disc recording and/or reproducing apparatus according to an embodiment of the present invention.

Referring to the drawings, the preferred embodiment of the present invention will be explained in detail.

A disc recording and/or reproducing apparatus according to the present invention is adapted to record voice data as recording data on a magneto-optical disc 1. The disc recording and/or reproducing apparatus includes a timer 2, a display unit 3, a recording and/or reproducing system 4, a system controller 5 and a keyboard 6 as shown in FIG. 1. The timer 2 counts the today's date by date of the month, month of the year and year current time by hour, minute and second and outputs the counted data as day and hour data which is the time data. The display unit 3 displays the day and hour responsive to day and hour data. The recording and/or system 4 records or reproduces voice data on the magneto-optical disc 1. The keyboard 6 has keys for designating recording or playback of the voice data.

The recording and/or reproducing system 4 has a low-pass filter (LPF) 10, an A/D converter 11, a first encoder 12, a RAM 13, a second encoder 14, a magnetic head driving circuit 15 and a magnetic head 16. The LPF 10 is supplied with voice signals as analog signals to be recorded on the magneto-optical disc 1 via an input terminal 7. The A/D converter 11 digitizes the voice signals from the LPF 11 for forming voice data. The first encoder 12 processes the voice data from the A/D converter 11 with compressing and encoding as later explained. The RAM 13 temporarily stores the voice data precessed by the first encoder 12. The second encoder 14 processes the voice data read from the RAM 13 with EFM (Eight-to-Fourteen modulation) encoding. The magnetic head driving circuit 15 forms modulated signals in accordance with the voice data from the second encoder 14. The magnetic head 16 applies modulated field to the magneto-optical disc 1 in accordance with the modulated signals from the magnetic head driving circuit 16.

The recording and/or reproducing system 4 also includes a spindle motor 17, an optical head 18, an RF circuit 19, a servo control circuit 20, a second decoder 21, a RAM 22, a first decoder 23, a D/A converter 24, a low-pass filter (LPF) 25 and a digital output circuit 26. The spindle motor 17 rotates the magneto-optical disc 1 at a constant linear velocity or a constant angular velocity. The optical head 18 radiates a laser beam to the magneto-optical disc 1 and receives the laser beam reflected from the magneto-optical disc 1. The RF circuit 19 amplifies the output signals from the optical head 18 and includes a matrix circuit for extracting error signals from the output signals of the optical head 18. The servo control circuit 20 controls the spindle motor 17 and the optical head according to a focusing error signal, tracking error signal and others which are extracted from the output signal from the optical head 18. The second encoder 21 processes the output signal from the RF circuit 19 with EFM decoding. The RAM 22 temporarily stores the output signal as voice data from the second decoder 21. The first decoder 23 processes the voice data read from the RAM 22 with expanding and decoding as later explained. The D/A converter 24 converts the voice data from the first decoder 23 into analog signals for forming voice signals. The LPF 25 eliminates high frequency signals from the voice signals from the D/A converter 24 and outputs the resulting signals. The digital output circuit 26 directly outputs the voice data from the first decoder 23 as digital output signals.

Figure 2:
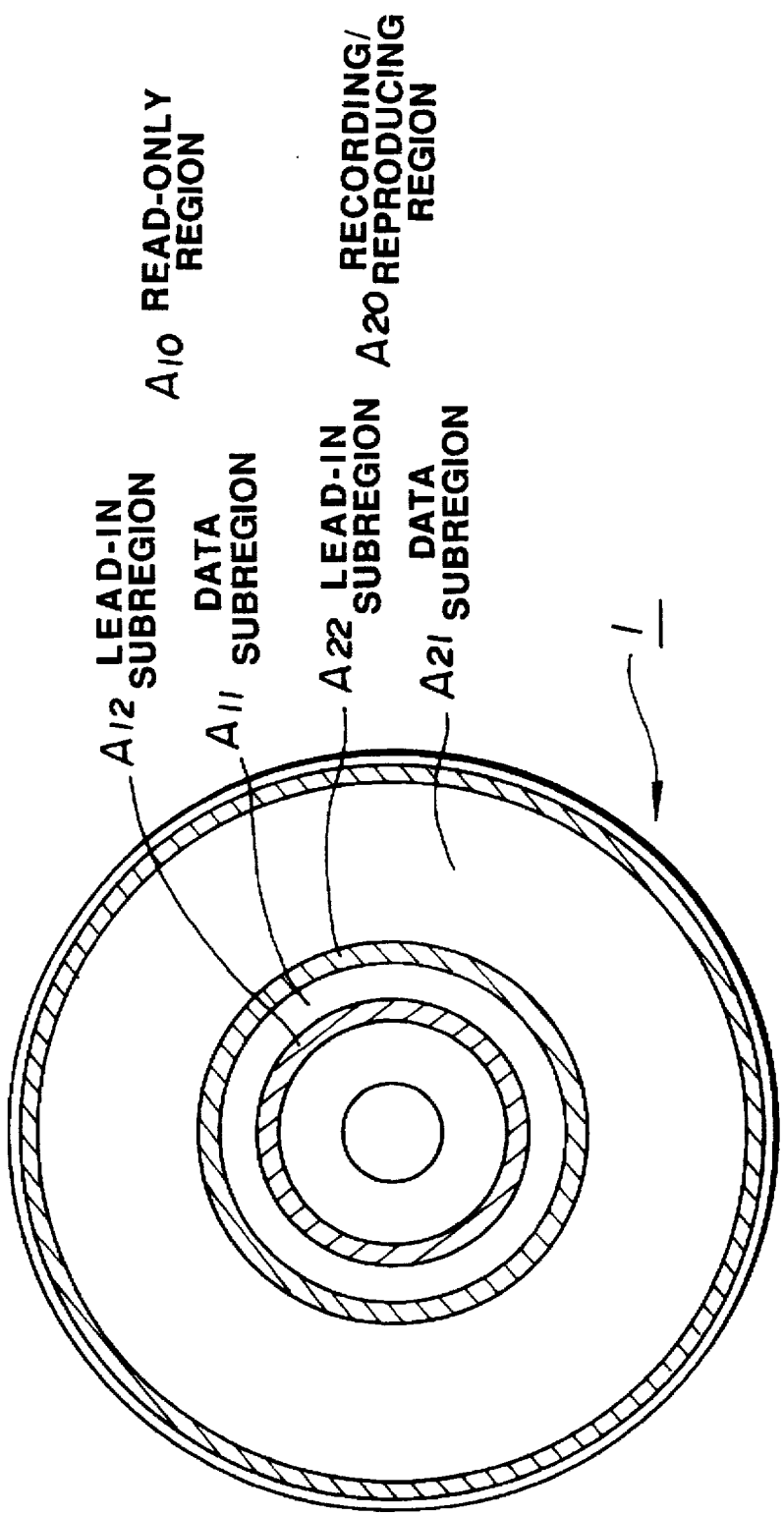
FIG. 2 shows a schematic view for illustrating an arrangement of an optical disc provided in the disc recording and/or reproducing apparatus as shown in FIG. 1.

The magneto-optical disc 1 has a read-only area A10 and a recording and reproducing area A20 provided an outer side of the read-only area A10, as shown in FIG. 2. The read-only area A10 is an area into which a disc manufacturer records required data and has a data area A11 in which is recorded data which is needed to reproduce the magneto-optical disc 1 and has a lead-in area A12 on an inner side of the data area A11. In the read-only area A10, digital data are recorded in the form of the presence or absence of pits corresponding to 1" or 0". In the lead-in area A10, the recording start address data and the recording end address data area are sequentially recorded for the totality of the play data as table-of-contents (TOC) data indicating the recording position and the recording contents of the data area A11.

The recording and reproducing area A20 of the magneto-optical disc is provided a magneto-optical recording medium and has a data area A21 in which data such as play data is recorded and in which a lead-in area A22 provided at an inner side of the data area A21.

In the disc recording and/or reproducing apparatus according to the embodiment, data are reproduced from the read-only area A10 and recorded in the recording and reproducing area A20 on a cluster-by-cluster basis.

Figure 3:
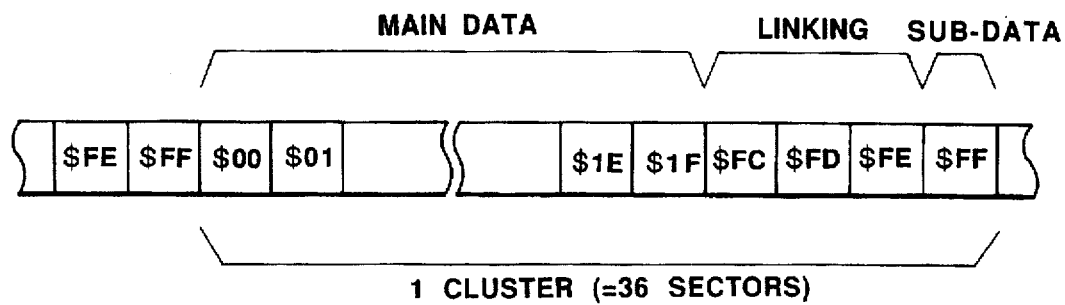
FIG. 3 shows a recording state of one-cluster recording data recorded on the optical disc.

Each cluster is made up of a total of 36 sectors, i.e. 32 sectors of main data, 3 sectors of linking data and 1 sector of sub-data, as shown in FIG. 3.

Figure 4:
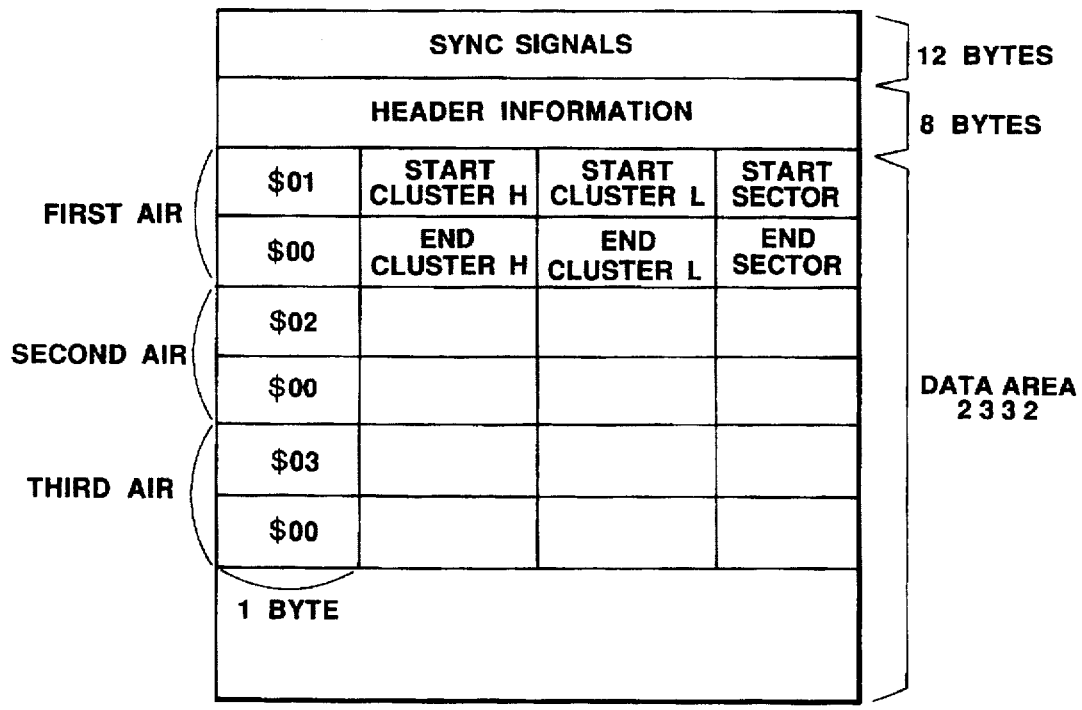
FIG. 4 shows a recording state of one-sector recording data recorded on the optical disc.

In the lead-in area A22, TOC data indicating the recording position or recording contents of data recorded in the data area A21 are recorded. For example, a sector bearing a sector number 00 is made up of 12 bytes of synchronization signals, 8 bytes of the header information and 2332 bytes of a data area, as shown in FIG. 4. In the data area, 8 bytes are used for each recording data and recording is made in an order of a number of recorded data, for example, music number, an upper order byte of a start cluster, a lower order byte of the start cluster, start sector, sector number 00, etc.

Figure 5:
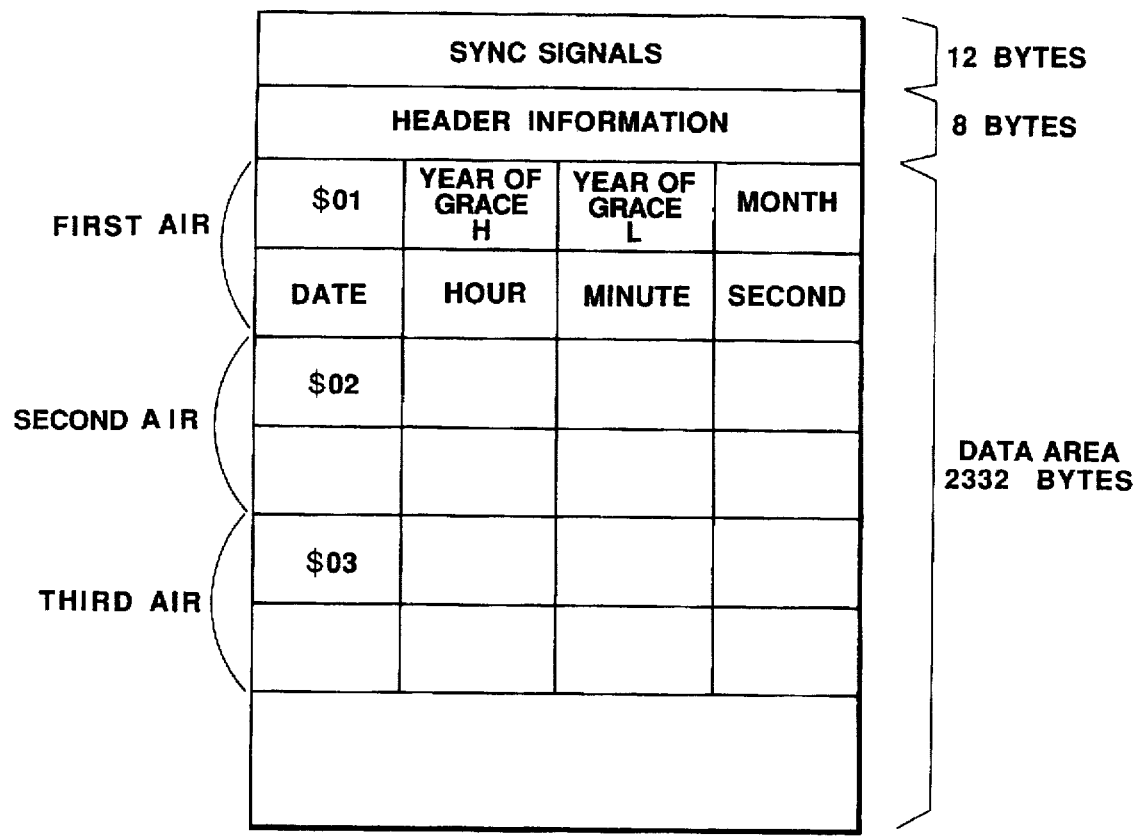
FIG. 5 shows a recording state of date and time data recorded on the optical disc.

In the disc recording and/or reproducing apparatus of the present embodiment, today's data by the day of the month, month of the year and the year by the year of Grace and the current time by hour, minute and second as the date and hour data are recorded, as shown in FIG. 5, under sector number 01 in the lead-in area A22 using 8 bytes per each recording item. Meanwhile, data indicating today's date may be recorded by the Japanese year number, using the year name of Heisei etc., instead of by the year of Grace.

The operation of the disc recording and/or reproducing apparatus of the present embodiment in the recording mode for recording desired voice data in the recording and reproducing area A20 of the magneto-optical disc 1 is explained. In this case, it is assumed that today's date by the day, month and the year and the current time by hour, minute and second are set to correct values. This recording mode is designated by actuating recording keys provided on a keyboard 6 shown in FIG. 1.

When the recording key is actuated, the magneto-optical disc 1 is rotationally driven by the spindle motor 17 at the constant linear velocity or the constant angular velocity. At the same time that desired voice signals, which are analog signals, are supplied via the input terminal 7 and the LPF 10 to the A/D converter 11. Meanwhile, the spindle motor 17 is controlled to be rotated at all times at a constant velocity by the servo control circuit 20.

The A/D converter 11 quantizes the voice signals forming the voice data having the data rate of 2 ch×16 bit×44.1 kHz 1.4 Mbits/sec, and supplies them to the first encoder 12.

The first encoder 12 processes the voice data quantized by the A/D converter 11 into voice data having the data rate of 1.4 Mbits/sec by so-called Modified Discrete Cosine Transform (MDCT) of the waveform on the time axis to produce about 1,000 components on the frequency axis and extracts these components beginning from those critical to the auditory sense to produce voice data having the data rate of 300 Kbits/sec. That is, the voice data having the data rate of 1.4 Mbits/sec are compressed into compressed voice data having the data rate of 300 kbits/sec which is one-fifth of the data rate before compression, for converting the data transfer rate from 75 sectors/sec in the standard CD-DA format, which is a format for Compact discs recorded 16 bits digital audio signal, to 15 sectors/sec. These compressed data are supplied to the RAM 13.

The timer 2 counts today's data by the day, month and year which is year of Grace, and the current time by hour, minute and second to supply the date and hour data to the system controller 5. When the recording key is actuated, the system controller 5 temporarily stores date and hour data supplied from timer 2 in a RAM 5a provided in the system controller 5, while supplying the data to the display unit 3.

The display unit 3 displays the date and hour data supplied from the system controller 5 to enable the user to recognize the date and hour. Meanwhile, the date and hour data may be temporarily stored in the RAM 13, as hereinafter explained, instead of in the RAM 5a in the system controller 5.

The RAM 13 has data writing and readout controlled by the system controller 5 and is used as a buffer memory for temporarily storing the compressed data supplied from the first encoder 12.

The compressed data supplied from the first encoder 12 has its data transfer rate reduced to one-fifth of the standard data transfer rate of 75 sectors/sec, that is to 15 sectors/sec. It is these compressed data that are continuously written in the RAM 13. Although it suffices to record these compressed data at a rate of one per five sectors, sector-continuous recording as described subsequently is performed because such recording of every five sectors is virtually impossible. This recording is carried out in a burst fashion at a rate of 75 sectors/sec with a predetermined number of, for example, 32 plus several sectors, as a recording unit, with the interposition of non-recording periods. That is, the compressed data continuously written at a low data transfer rate of 15 (=75/5) sectors/sec; corresponding to the above-mentioned bit compression rate, is read in the RAM 13 in a burst fashion at the above-mentioned transfer rate of 75 sectors/sec. Although the overall data transfer rate of the data thus read out and recorded, inclusive of the non-recording period, is the above-mentioned low rate of 15 sectors/second, the instantaneous data transfer rate within the time interval of the recording operation carried out in a burst-like manner is the above-mentioned rate of 75 sectors/sec.

The compressed data read out from the RAM 13 in the burst fashion at the transfer rate of 75 sectors/sc is supplied to the second encoder 14.

The second encoder 14 processes the compressed data, read out from the RAM 13 in a burst fashion, with encoding for error correction, that is appendage of parity data and interleaving, and EFM encoding. The recording data, thus encoded by the second encoder 14, is supplied to the magnetic head driving circuit 15.

The magnetic head driving circuit 15 drives the magnetic head 16 for applying modulated magnetic field conforming to the compressed data to the magneto-optical disc 1.

On the other hand, the system controller 5 controls the RAM 13 as described above, while controlling recording positions for continuously recording the compressed data read out in a burst fashion from the RAM 13 on the recording track(s) on the magneto-optical disc 1. This recording position control is performed by supervising the recording position of the compressed data read out in a burst fashion from the RAM 13 by the system controller 5 and supplying control signals designating the recording position on the recording track(s) of the magneto-optical disc 1 to the servo control circuit 20.

That is, in the disc recording and/or reproducing apparatus of the embodiment illustrated, the voice data outputted from the A/D converter 11 is the PCM audio data having the sampling frequency of 44.1 KHz, the number of quantization bits of 16 and the data transfer rate of 74 sectors/sec. These data are supplied to the first encoder 12 from which compressed data are outputted at a ⅕ transfer rate of 15 sectors/sec. The compressed data continuously outputted from the first encoder 12 at the transfer rate of 15 sectors/sec is supplied to the RAM 13.

Figure 6:
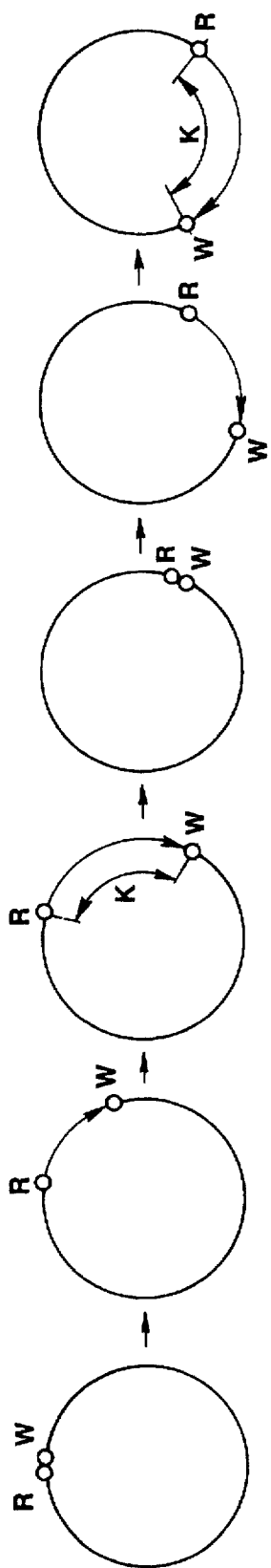
FIG. 6 shows the state of memory during the recording mode of the disc recording and/or reproducing apparatus as shown in FIG. 1.

The system controller 5 controls the RAM 13 in such a manner that, as shown in FIG. 6, a write pointer W of the RAM 13 is continuously incremented at the transfer rate of 15 sectors/sec to write the compressed data continuously at the transfer rate of 15 sectors/sec and, when the data volume of the compressed data stored in the RAM 13 exceeds a predetermined value K, a read pointer R of the RAM 13 is incremented in a burst-like manner at a transfer rate of 75 sectors/sec to read out the compressed data from the RAM 13 by the predetermined volume K at the transfer rate of 75 sectors/sec.

By the above-described memory control by the system controller 5, in which the compressed data is written from the first encoder 12 in the RAM 13 at e.g. the transfer rate of 15 sectors/sec and, when the volume of the compressed data stored in the RAM 13 exceeds the volume K, the read pointer R of the RAM 13 is incremented in a burst fashion at the transfer rate of 75 sectors/sec to read the compressed data of the volume K from the RAM 13 in a burst-like manner at the above-mentioned transfer rate of 75 sectors/sec, input data may be continuously written in the RAM 13 while maintaining a data write region in the RAM 13 in excess of the predetermined volume.

It is noted that, by controlling the recording position on the recording track of the magneto-optical disc 1 by the system controller 5, the recording data read out in the burst fashion from the RAM 13 may be continuously recorded on the recording track(s) of the magneto-optical disc 1. Besides, since a data recording region in excess of the predetermined volume is perpetually maintained in the RAM 13, input data may be continuously recorded in the data recording region in excess of the predetermined volume, even if the system controller 5 detects the occurrence of track jump due to disturbances to interrupt the recording operation on the magneto-optical disc 1, and a resetting operation may be undertaken in the interim. As a result of which the input data may be continuously recorded on the recording track(s) of the magneto-optical disc 1.

Figure 7:
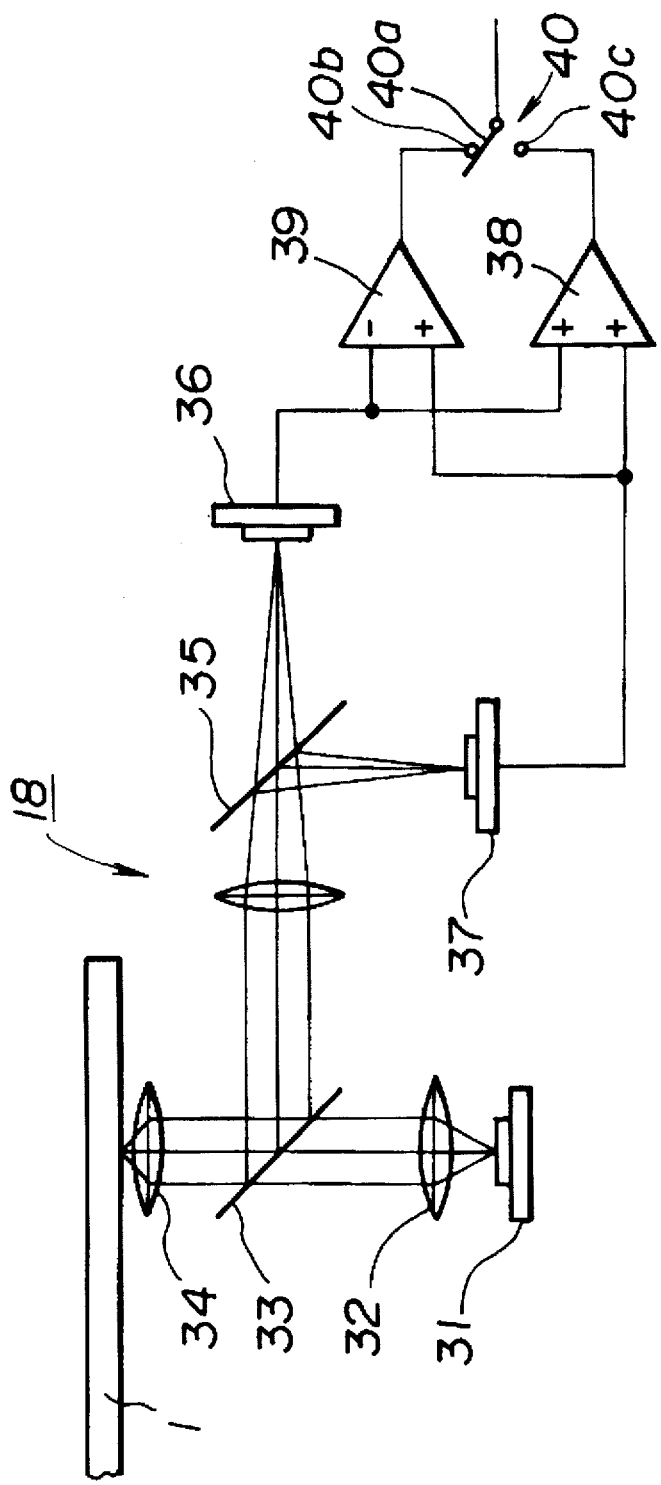
FIG. 7 shows a block diagram of an optical head used in the disc recording and/or reproducing apparatus as shown in FIG. 1.

The optical head 18, as shown in FIG. 7, includes a laser diode 31 as a light source, a collimator lens 32, a beam splitter 33, an objective lens 34, a polarized beam splitter 35, first and second photodetectors 36, 37 and first and second summation units 38, 39. The collimator lens converts the laser beam emitted from the laser diode 31 to a parallel laser beam. The beam splitter 33 separate the laser beam emitted from the laser diode 31 and the laser beam reflected by the magneto-optical disc 1. The objective lens 34 focuses the laser beam emitted from the laser diode 31 on the magneto-optical disc 1. The polarized beam splitter 35 separates the laser beam reflected the magneto-optical disc into two laser beams. The photodetectors 36, 37 receive the two beams. The first summation unit 38 additively sums detecting output signals from the photodetectors 36, 37. The second summation unit 39 subtractively sums the detecting output signals from the photodetectors 36, 37. The optical head 18 is arranged facing the magnetic head 16 with the magneto-optical disc 1 in-between.

When voice data is recorded in the recording and reproducing area of the magneto-optical disc 1, the optical head 18 radiates the laser beam on a target track of the magneto-optical disc 1 which is applied to the modulated magnetic field in accordance with the recording voice data by the magnetic head 16 driven by the magnetic head driving circuit 15. As a result, the voice data is thermo-magnetically recorded on the magneto-optical disc 1. During the recording mode and the playback mode as later explained, the optical head 18 detects focusing and tracking errors, by so-called astigmatic method and push-pull method, extracted from the output signals detected from the reflected laser beam from the target track.

A changeover switch 40, provided in the optical head 18, is controlled by the system controller 5. During the recording mode, a movable contact 40a of the switch 40 is moved to a fixed terminal 40c by the system controller 5. Consequently, during the recording mode, a sum signal from the first summation unit 38, resulting from additive summation of the detection outputs from the photodetectors 36, 37, is supplied to the RF circuit 19 shown in FIG. 1.

The RF circuit 19 extracts the focusing and tracking error signals from an output of the optical head to supply the extracted signals to servo control circuit 20 and converts the output signal from the optical head 18 into binary signals which are supplied to the second decoder 21 which will be explained subsequently.

The servo control circuit 20 has a focusing servo control circuit, a tracking servo control circuit, a spindle servo circuit and a thread servo circuit etc. The focusing servo control circuit focusing servo controls an optical system of the optical head 18 so that the focusing error signal is reduced to zero. The tracking servo control circuit tracking servo controls an optical system of the optical head 18 so that the tracking error signal is reduced to zero. The spindle servo control circuit controls the spindle motor 17 so that the magneto-optical disc 1 is rotationally driven at the constant linear velocity or the constant angular velocity. The thread servo control circuit translates the optical head 18 and the magnetic head 16 in the radial direction of the magneto-optical disc 1 and to a target track of the magneto-optical disc 1 designated by the system controller 5.

The servo control circuit 20, performing these various control operations, transmits the data indicating the operating states of the various parts controlled by the servo control circuit 20 to the system controller 5.

The system controller 5 controls the above-mentioned various control circuits in accordance with the information indicating the operating states of the various parts for supervising the recording positions on the recording track traced by the magnetic head 16 and the playback positions on the recording track during the playback mode which will be explained subsequently.

The recording mode is terminated by actuating a recording end key provided on the keyboard 6. When the recording end key is actuated, the system controller 5 temporarily stores the date and hour data supplied from the timer 2 again in the RAM 5a.

The system controller 5 reads recording position data indicating the recording position in the data area A21 of the recording and reproducing area A20 as well as date and hour data indicating the recording start date and hour and recording end data and hour, temporarily stored in the RAM 5a, for automatically forming a TOC data table in the RAM 5a from these data for recording the TOC data table as TOC data in the lead-in area A22.

Figure 8:
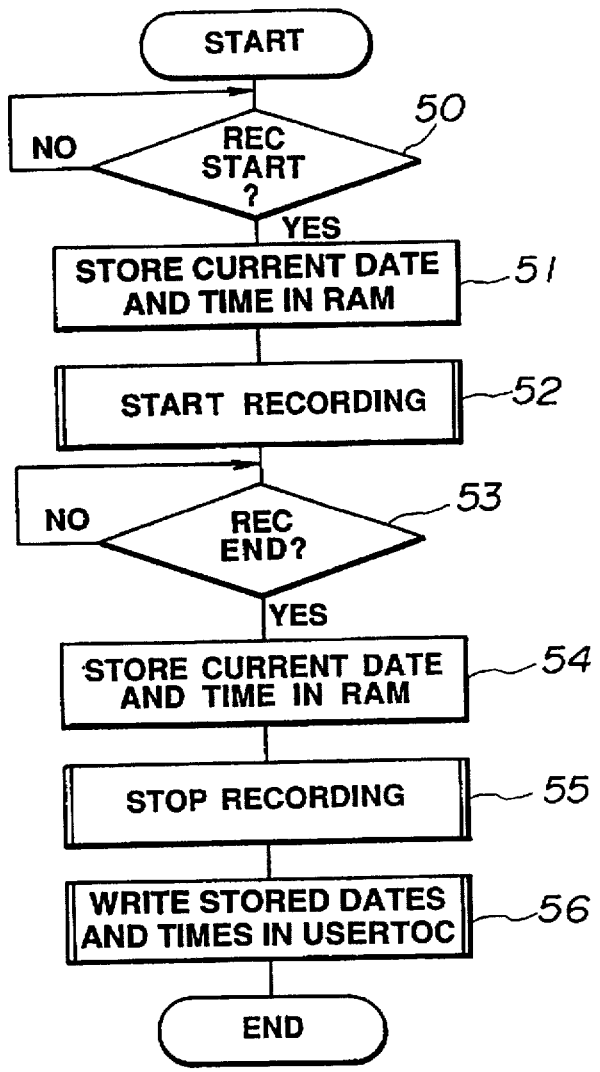
FIG. 8 shows a flow chart for illustrating the recording operation of the date and time data during the recording mode of the disc recording and/or reproducing apparatus as shown in FIGURE 1.

FIG. 8 shows a flow chart showing the operation of the recording and/or reproducing apparatus during the recording mode. In the flow chart shown in FIG. 8, the program is started by turning on a main power source of the recording and/or reproducing apparatus.

The program then proceeds to step 50 where it is decided if the recording key provided on the keyboard 6 has been turned on. If the answer is YES, the program proceeds to step 51 and, if the answer is NO, the program repeats the step 50 until the recording key is turned on.

At step 51, the system controller 5 temporarily stores the date and hour data supplied from the timer 2 when the recording key has been turned on in the RAM 5a before proceeding to step 52.

At step 52, voice data is recorded in the data area A21 of the recording and reproducing area A20 of the magneto-optical disc 1 as described above before the program proceeds to step 53.

At step 53, it is decided if the recording end key provided on the keyboard 6 has been turned on. If the answer is YES, the program proceeds to step 54 and, if the answer is NO, the program repeats the step 53 until the recording end key is turned on.

At step 54, the system controller 5 temporarily stores the data and hour data supplied from timer 2 when the recording end key has been turned off in the RAM 5a before proceeding to step 55.

At step 55, the voice data recording is terminated before the program proceeds to step 56.

At step 56, the system controller 5 reads out the date and hour data when the recording key has been turned on, and the date and hour data when the recording end key has been turned off, once stored in the RAM 5a, to record these data as TOC data in the lead-in area A22 of the magneto-optical disc 1, before the program comes to an end.

Figure 9:
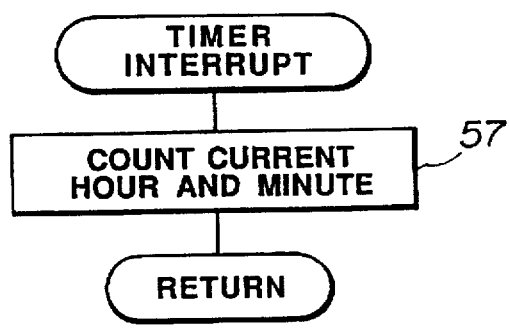
FIG. 9 shows a flow chart for illustrating an interrupt subroutine during the recording mode of the disc recording and/or reproducing apparatus as shown in FIG. 1.

Meanwhile, it may become desirable to recognize the current hour and minute during recording of the voice data. In such case, an hour and minute designating key is actuated for designating the current hour and minute for executing an interrupt routine shown in FIG. 9. That is, if the hour and minute designating key is actuated, the display unit 3 is controlled by the system controller 5 at step 57 so that the hour and minute is displayed responsive the hour and minute data supplied from the timer 2 before reverting to recording of the voice data. This permits the current hour and minute to be recognized even during the recording.

In this manner, in the disc recording and/or reproducing apparatus, the date and time data from the timer 2 when the system controller 5 is in the recording mode is stored in the RAM 5a, while the date and time data when the recording mode is at an end is temporarily stored in the RAM 5a and the stored data are read out and recorded as the TOC data in the lead-in area A22 of the magneto-optical disc 1. As a result, the correct recording start and end date and time may be automatically recorded on the magneto-optical disc 1 without the necessity of carrying out a laborious operation of noting down date and time in a memo etc. each time voice data is recorded and subsequently manually recording the data and time as TOC data in the lead-in area A22.

The operation of the disc recording and/or reproducing apparatus during the playback mode of reproducing the recording data continuously recorded on the recording track (s) of the read-only area A10 and the recording and reproducing area A20 is hereinafter explained.

When the magneto-optical disc 1 is loaded on the disc recording and/or reproducing apparatus, the system controller 5 causes the magneto-optical disc 1 to be rotationally driven at the constant linear velocity or the constant angular velocity. The system controller 5 controls the recording and/or reproducing system 4 and stores in the RAM 5a the TOC data reproducing from the lead-in area A12 of the read-only-area A10 to supervise the playback position in the data area A11 of the read-only area A10. At the same time, the system controller 5 stores the TOC data including the above-mentioned date and time data in the RAM 5a from the lead-in area A22 of the recording and reproducing area A20 to supervise the playback position in the data area A21 of the recording and reproducing area A20. Then the system controller 5 is in a stand-by mode which waits to receive the playback start command from the keyboard 6.

The system controller 5 stores the TOC data reproduced from the lead-in area A12 of the read-only area A10 and the TOC data reproduced from the lead-in area A22 of the recording and reproducing area A20. The system controller 5 controls the display unit 3 to display data in accordance with the stored TOC data. The date and time data indicating recording start and end date and time are recorded as TOC data in the lead-in area A22 of the recording and reproducing region A20, as described above. As a result, the recording start date and time as well as the recording end data and time of the voice data is recorded in the display unit 3. Consequently, the user is at a position to recognize the correct recording start and end date and time of the voice data recorded in the recording and reproducing region A20 easily so that arrangement of data on the magneto-optical disc according to the chronological order may be made easily to reduce costs in controlling the recorded voice data.

Besides, since the date and the time data indicating the recording start and the end time of the voice data is recorded as TOC data, the voice data may be accessed easily in the chronological order in which they are recorded. For example, the user can confirm the date and time data by the display unit 3 and can access the desired voice data by manual operation. It is possible to automatically access the designated voice data corresponding to the stored TOC data including the date and the time data. In this case, the system controller 5 compares the date and the time data stored in the RAM 5a with the date and the time data inputted from the keyboard 6 and controls the recording and/or reproducing system 4 according to the result of the comparison. As a result, the designated voice data are reproduced.

When the playback key of the keyboard 6 is activated to designate the playback mode, the system controller 5 causes the spindle motor 17 to be rotationally driven at the constant linear velocity of the constant angular velocity for rotationally driving the magneto-optical disc 1. At the same time, the system controller 5 controls the recording and/or reproducing system 4 to translate the optical head 18 according to the TOC data stored in the RAM 5a to a position of the magneto-optical disc 1 where the designated voice data is recorded.

When reproducing data from the read-only area A10 of the magneto-optical disc 1, the optical head 18 detects changes in the volume of the laser beam reflected from the target track to produce playback signals. Detection outputs from photodetectors 36, 37 are additively summed by the first signal summation unit 38 to produce playback signals which are supplied to the RF circuit 19 via the changeover switch 40. When reproducing data from the recording and playback area A20 of the magneto-optical disc 1, the optical head 18 detects the difference in the angle of deflection such as Kerr rotation angle of the laser beam reflected from the target track to produce playback signals. Detection outputs from photodetectors 36, 37 are subtractively summed by the second signal summation unit 38 to produce playback signals which are outputted via the changeover switch 40.

The above-mentioned playback signals, outputted via the changeover switch 40, are converted by the RF circuit 19 into binary signals before being supplied to the second decoder 21.

The second decoder 21, which is a counterpart of the second encoder 14, processes the binary playback output from the RF circuit 19 by the above-mentioned decoding for error correction and EFM decoding and reproduces the above-mentioned compressed data at the transfer rate of 75 sectors/sec to supply the reproduced data to the RAM 22. The RAM 22 has its data writing and readout controlled by the system controller 5, and the playback data, supplied from the second decoder 21 at the transfer rate of 75 sectors/sec, are continuously read from the RAM 22 at the transfer rate of 15 sectors/sec.

The system controller 5 controls the RAM 22 so that the playback data are written into the RAM 22 at the transfer rate of 75 sectors/sec and the playback data thus written are continuously read at the data transfer rate of 15 sectors/sec and controls the playback position of the recording and/or reproducing system 4 to continuously reproduce the playback data written in the above-described manner in the RAM 22 from the recording track(s) of the magneto-optical disc 1. The playback position control by the system controller 5 is made by supervising the playback position of the playback data read out in a burst fashion from the RAM 22 by the system controller 5 for supplying the control signals designating the playback position on the recording track(s) of the magneto-optical disc 1 to the servo control circuit 20.

Figure 10:
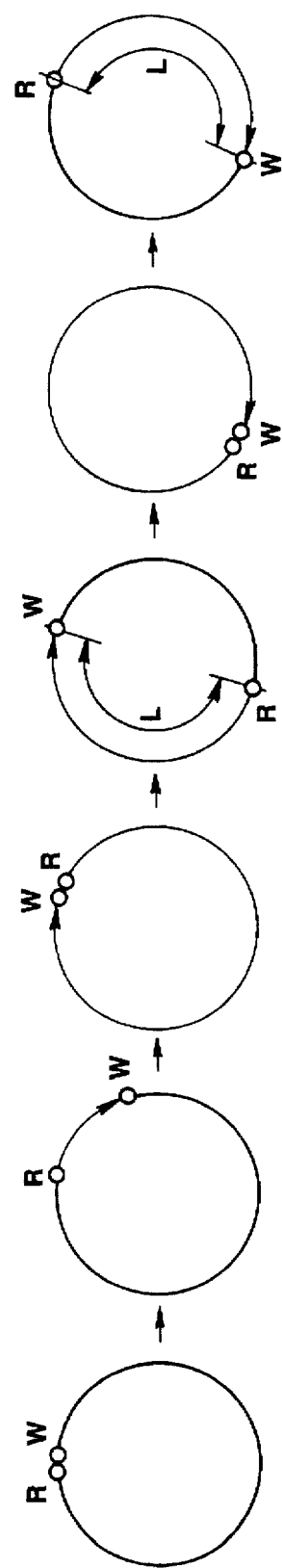
FIG. 10 shows the state of a memory during the reproducing mode of the recording and/or reproducing apparatus as shown in FIG. 1.

That is, the system controller 5 controls the RAM 22 by incrementing the write pointer W of the RAM 22 at the transfer rate of 75 sectors/sec for writing the playback data in the RAM 22 at the transfer rate of 75 sectors/sec, continuously incrementing the read pointer R at the transfer rate of 15 sectors/sec for continuously reading out the playback data from the RAM 22 at the transfer rate of 15 sectors/sec, terminating the writing when the write pointer W overtakes the read pointer R and by incrementing the write pointer W of the RAM 22 at the transfer rate of 75 sectors/sec to re-initiate writing when the volume of the playback data stored in the RAM 22 is below a predetermined volume L, as shown in FIG. 10.

By the above-described memory control by the system controller 5, the compressed data reproduced from the recording track(s) of the magneto-optical disc 1 are written in a burst fashion in the RAM 22 at the transfer rate of 75 sectors/sec and are continuously read out from the RAM 13 at the transfer rate of 15 sectors/sec, so that the playback data may be continuously read from the RAM 22 while a data readout region in excess of the volume L is maintained in the RAM 22 which is a counterpart of the RAM 13. On the other hand, the playback data read out in a burst fashion from the RAM 22 may be continuously reproduced from the recording track(s) of the magneto-optical disc 1 by the system controller 5. Besides, since a data readout region in excess of the predetermined volume L is perpetually maintained in the RAM 22, the playback data may be read from the data readout region storing data in excess of the data volume K to continue the outputting of the playback data, and the resetting operation may be undertaken in the interim, even if the system controller 5 detects the occurrence of track jump etc. by disturbances to interrupt the playback operation from the magneto-optical disc 1.

The compressed data read out continuously from the RAM 22 at the transfer rate of 15 sectors/sec are supplied to the first decoder 23. The first decoder 23, which is a counterpart of the first encoder 12, expands the compressed data at a factor of five under the operating mode designated by the system controller 5 to form voice data which is the digital data with the transfer rate of 75 sectors/sec. The voice data from the first decoder 23 are supplied to the D/A converter 24 and to the digital output circuit 26.

The D/A converter 24 converts the voice data supplied from the first decoder 23 into analog voice signals which are outputted via the LPF 25. The voice signals from the LPF 25 are taken out at the output terminal 9.

The digital output circuit 26 directly outputs the voice data supplied from the first decoder 23 as voice signals which are taken out at the output terminal 8.

It is seen from above that, in the disc recording and/or reproducing apparatus, the system controller 5 records the date and time data supplied from the timer 2 when the recording key on the keyboard 6 is actuated and the date and time data supplied from the timer 2 when the recording end key is actuated, simultaneously with the recording position of the voice data recorded on the magneto-optical disc 1, as TOC data, so that the correct recording start date and time and the correct recording end data and time may be automatically recorded on the magneto-optical disc 1. As a result, the user do not need to carry out a laborious operation of manually writing the above date and time in the lead-in area as the TOC data.

Besides, in the disc recording and/or reproducing apparatus, the above date and time data recorded simultaneously with the recording positions of the voice data recorded on the magneto-optical disc 1 may be controlled during the playback mode so as to be displayed on the display unit 3 to permit the correct data and time of recording the voice data to be recognized easily.

As a result, the recording on the magneto-optical disc may be arranged in the order of the recording dates or voice data so that control costs may be diminished.

Besides, since the date and time data indicating the voice data recording start date and time and the recording end date and time are recorded as TOC data, the voice data may be accessed in the order of the recording dates.

Although both the recording start date and time and the recording end date and time are recorded in the above description, one of the recording start date and time and the recording end date and time may be recorded or only the recording year,recording date, recording hour, recording end year, recording end data or the recording end hour may be recorded.

In addition, the present invention may be used with a write-once type optical disc instead of a magneto-optical disc. In this case, voice data and date and time data to be recorded on the write-once type optical disc is supplied to an optical head during the recording. When the voice data recorded on the write-once type optical disc is reproduced from the write-once type optical disc, the optical head radiates laser beams on the write-once type optical disc and detects reflected laser beams from the write-once type optical disc. The write-once type optical disc has a lead-in area and a recording area as above mentioned magneto-optical disc. Within the lead-in area of the write-once type optical disc are recorded the date and time data as TOC data.

What is claimed is:

1. A disc recording and reproducing apparatus for using an optical disc having a recording area in which data is recorded and a lead-in area in which data related to the data recorded in the recording area is recorded, said apparatus comprising:

a timer for generating time of day data and outputting such time of day data;

a display for displaying time corresponding to said time of day data;

recording and reproducing means for recording and reproducing the data and the time of day data on the optical disc;

a memory for storing the time of day data generated by the timer;

a controller for controlling said recording and reproducing means to record in said memory at least one of the time of day data generated by the timer when said recording and reproducing means starts recording the data in the recording area of the optical disc and the time of day data when said recording and reproducing means stops recording the data in the recording area of the optical disc; and the controller further controlling said recording and reproducing means and said display, wherein said recording and reproducing means is controlled to record the data in the recording area of the optical disc and, after the recording of the data in the recording area of the optical disc has stopped, to record in the lead-in area of the optical disc the time of day data stored in the memory, said recording and reproducing means controlled by said controller during the playback to read and reproduce the data recorded in the recording area and to read and reproduce the time of day data recorded in the lead-in area of the optical disc, said display controlled by said controller to display the time corresponding to the reproduced time of day data.

2. An optical disc recording apparatus, comprising:

a timer for generating time of day data and outputting such time of day data;

recording means for recording information signals on an optical disc, said optical disc having a recording area in which the information signals are recorded and a lead-in area having a first area and a second area, said first area including data which is necessary in advance of recording the information signals in said recording area, said second area including data related to the information signals recorded in said recording area and time of day data corresponding to a start of recording and an end of recording for each separate recording of the information signals recorded in the recording area of the optical disc;

a memory for storing the time of day data generated by the timer;

a controller for controlling said recording means to record in said memory at least one of the time of day data generated by the timer when said recording means starts recording the data in the recording area of the optical disc and the time of day data when said recording means stops recording the data in the recording area of the optical disc; and the controller further controlling said recording means to record the information signals in the recording area and to record in the second area of the lead-in area of the optical disc, after said control means receives a command to stop the recording of the information signals, the time of day data stored in the memory.

3. An optical disc recording apparatus comprising:

a timer for generating current time of day data and for outputting such time of day data;

a display for displaying time corresponding to said time of day data;

recording means for recording information signals on an optical disc, said optical disc having a recording area in which the information signals are recorded and a lead-in area having a first area and a second area, said first area including data which is necessary in advance of recording to record the information signals in said recording area, said second area including data related to the information signals recorded in said recording area;

a memory for storing at least a portion of the time of day data generated by the timer;

a controller for controlling said recording means to record in said memory at least one of the time of day data generated by the timer when said recording means starts recording the information signals in the recording area of the optical disc and the time of day data when said recording means stops recording the information signals in the recording area of the optical disc; and the controller further controlling said recording means and said display, wherein said recording means is controlled to record the information signals in the recording area of the optical disc and when the recording of the information signals in the recording area of the optical disc has stopped, to record in the lead-in area of the optical disc the time of day data stored in the memory, said display controlled by said controller to display the current time of day data when said controller receives during said recording of the information signals a command to display the current time of day data.

* * * * *